Aug. 7, 1923.

J. F. ALLISON

TRAP

Filed Dec. 21, 1921

Inventor
James F. Allison

By Richard B. Owen
Attorney

WITNESSES

Aug. 7, 1923.

J. F. ALLISON 1,464,399

TRAP

Filed Dec. 21, 1921

WITNESSES
Guy M. Spring
Chas. E. Smith

Inventor
James F. Allison
By Richard B. Owen
Attorney

Patented Aug. 7, 1923.

1,464,399

UNITED STATES PATENT OFFICE.

JAMES F. ALLISON, OF McMINNVILLE, TENNESSEE.

TRAP.

Application filed December 21, 1921. Serial No. 523,925.

*To all whom it may concern:*

Be it known that I, JAMES F. ALLISON, a citizen of the United States, residing at McMinnville, in the county of Warren and State of Tennessee, have invented certain new and useful Improvements in a Trap, of which the following is a specification.

The present invention relates to a trap for catching animals and has for its principal object to generally improve upon devices of this nature by providing a structure which is extremely simple and efficient in operation and which may be manufactured at a comparatively low cost.

Another object of the invention is to provide a trap of this nature which will be durable, strong, and capable of firmly gripping the animal so as to prevent his escape.

A still further object of the invention is to provide novel setting and tripping means for the trap.

With these and numerous other objects in view, the invention resides in certain novel features of construction, and the combination and arrangement of parts as will be hereinafter more fully described and claimed.

In the drawing:—

Figure 1:
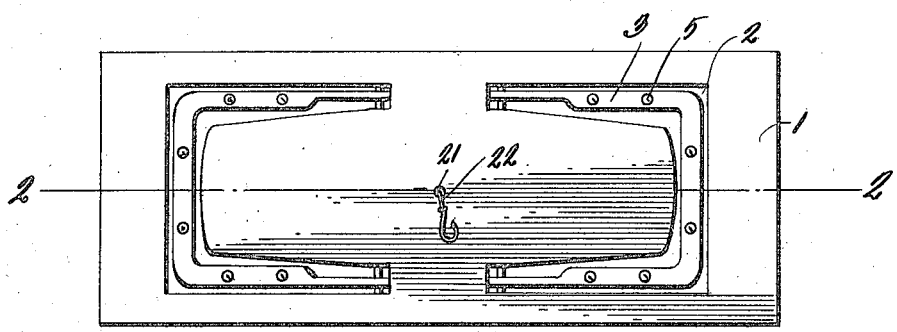
Figure 1 is a top plan of the trap.
Figure 2:
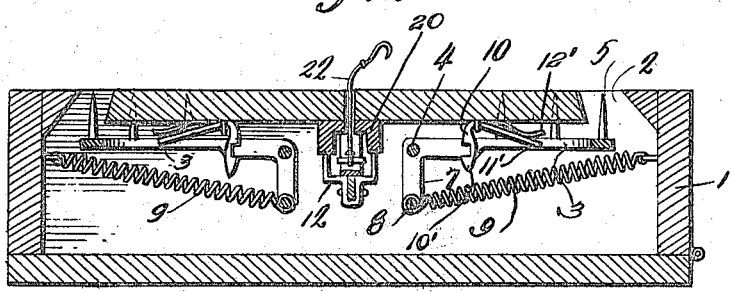
Figure 2 is a longitudinal vertical section taken on the line 2—2 of Figure 1.
Figure 5:
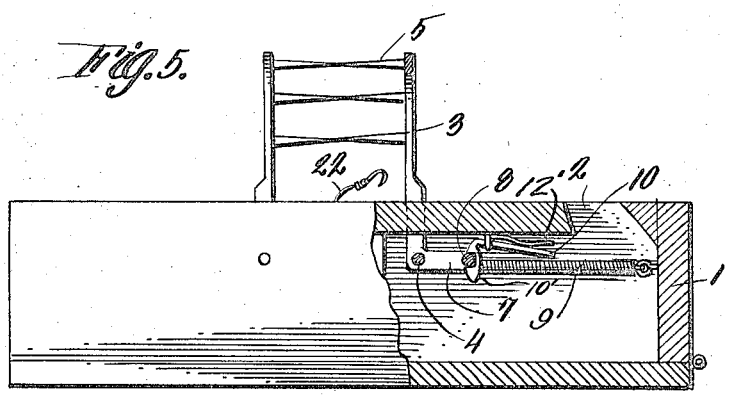
Figure 5 is a side elevation of the trap showing a portion thereof in section.

Referring to the preferred embodiment of the invention as disclosed in the drawing it will be seen that the case 1 is formed substantially rectangular in top plan and the upper platform thereof is provided with a pair of U-shaped slots 2 which have their ends extending toward each other. A pair of U-shaped jaws 3 are pivoted at 4 within the case 1 so as to be capable of swinging to horizontal and vertical positions such as are indicated in Figures 2 and 5 respectively. Each of the jaws are provided with a plurality of prongs 5 which extend vertically therefrom when the jaws are in a horizontal position and extend toward each other when the jaws are in a vertical position so as to firmly grasp the animal between the jaws. Each jaw 3 is provided at its terminals with a pair of angular extensions 7 which have their terminals bridged by a rod 8. One end of a coil spring 9 is attached to each rod 8 and its other end is suitably fixed to an end of the case 1 so as to normally hold the jaws in an approximate vertical position. A pair of pivoted spring pressed dogs 10 are situated in the casing beneath the platform thereof for engaging the rods 8 so as to lock the jaws in their vertical positions as is indicated to advantage in Figure 5, and thus it will be impossible for the animal to work loose from engagement with the prongs 5. Each dog 10 includes a notched body portion 10′ having an angular extension 11′ which is engaged by the leaf spring 12′ as is illustrated to advantage in Figure 2.

Figure 3:
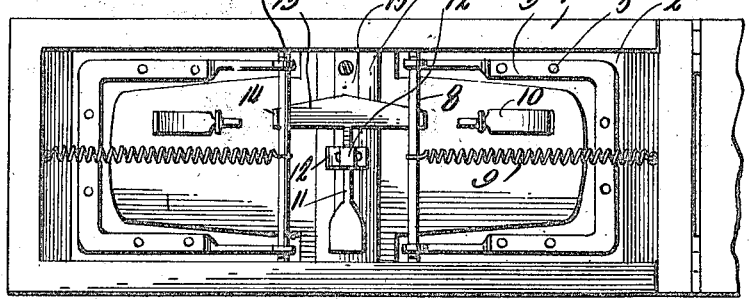
Figure 3 is a bottom plan of the trap with the hinged closure in an open position.
Figure 4:
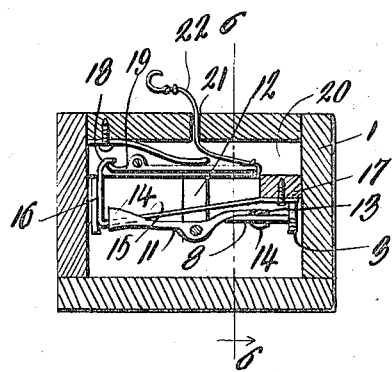
Figure 4 is a central transverse vertical section.
Figure 6:
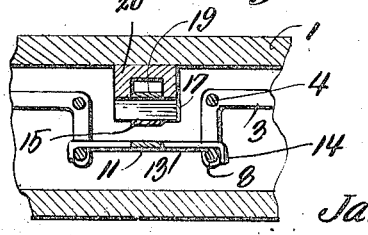
Figure 6 is a detailed section taken on the line 6—6 of Figure 4 looking in the direction of the arrow.

The setting mechanism of the trap comprises a lever 11 which is suitably pivoted in a bracket 12 and is provided at one end with a cross bar 13 having angular extending lips 14 at each end for the purpose of engaging the rods 8 and thereby holding the jaws in a horizontal position as is indicated in Figures 3 and 6. The other end of the lever 11 is provided with a pair of spaced parallel ears 14 forming a seat for the spring 15 which tends to disengage the cross bar 13 of the lever 11 from the rods 8 so that the springs 9 may actuate the jaws to a vertical position. This spring 15 is provided with an angular extension 16 at one end while the other end thereof is fixed to a block 17 mounted in the case 1. The angular extension 16 has a lip 18 which is engageable with a spring pressed pivoted dog 19 carried in the slot of the block 20 which is fixed to the platform of the case 1 intermediate its ends so as to extend transversely thereacross. An aperture 21 is provided in the platform so as to be centrally located and a string or other flexible member 22 is passed therethrough and has one end attached to one end of the pivoted dog 19. The other end of the flexible member 22 is provided with a baiting hook. When the spring pressed dog 19 is fulcrumed this will allow the lip 18 on the angular extension of the spring 15 to slip from engagement therewith.

When it is desired to set the trap the jaws are moved to a horizontal position after the rods 8 have been disengaged from the spring pressed dog 10 and by pressing upon the pocketed end of the lever 11 it will be seen that the lips of the cross bar 13 will engage the rods 8 for holding the jaws in a horizontal position. At the same time the spring 16 will be forced into the slot of the block 20 so that its lip 18 will engage the spring pressed dog 19. Bait is then placed upon the hooks of the flexible member 22. When an animal attempts to move the bait from the hook of the flexible member he will naturally jerk or pull the same thereby pivoting the spring pressed dog 19 so as to release it from engagement with the lip 18 of the extension 16 of the spring 15 which will allow this spring to fulcrum the lever 11 so as to release the lips 14 of its cross bar 13 from engagement with the rods 8. The spring 15 is preferably formed of spring metal throughout so that the lip 18 may readily spring from engagement with the end of the dog 19 when the same is pivoted. Whereupon the coil springs 9 will snap with considerable force the jaws 3 to a vertical position and as soon as they have reached the vertical position the rods 8 will be caught by the spring pressed pawls 10 so that the jaws are efficiently locked in a vertical or engaging position.

Having thus described my invention what I claim as new is:—

1. In combination, a support, a pair of pivoted jaws on the support, means associated with the pivoted jaws for urging them to an engaging position, means for normally holding the jaws in a non-engaging position, a spring for actuating the last mentioned means, said spring including a lip, a spring pressed dog for normally engaging the lip so as to hold the spring in a non-actuating position, and means for actuating or releasing the spring pressed dog.

2. In combinatiton, a support, a pair of pivoted jaws on the support, a lever including a cross bar at one end, lips on the terminals of the cross bar for engaging the jaws so as to hold them in a non-engaging position, a spring positioned on the support so as to normally engage the lever so as to actuate the same in a non-engaging position with respect to the jaws, a spring pressed dog for engaging the spring so as to hold it in a non-actuating position, means for actuating or releasing the dog and means for normally urging the jaws to an engaging position.

In testimony whereof I affix my signature in presence of two witnesses.

JAMES F. ALLISON.

Witnesses:
HORACE H. STILES,
LOUIS L. PACE.